(12) United States Patent
Grover et al.

(10) Patent No.: US 9,300,582 B2
(45) Date of Patent: Mar. 29, 2016

(54) METHOD AND APPARATUS FOR FORWARDING INFORMATION BASE SCALING

(71) Applicant: CISCO TECHNOLOGY, INC., San Jose, CA (US)

(72) Inventors: Hasmit Grover, Fremont, CA (US); Dhananjaya Rao, Milpitas, CA (US); Victor Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 13/719,510

(22) Filed: Dec. 19, 2012

(65) Prior Publication Data

US 2014/0169368 A1   Jun. 19, 2014

(51) Int. Cl.
*H04L 12/56* (2006.01)
*H04L 12/741* (2013.01)
*H04L 12/715* (2013.01)

(52) U.S. Cl.
CPC .............. *H04L 45/745* (2013.01); *H04L 45/64* (2013.01)

(58) Field of Classification Search
CPC ........................................................ H04L 12/56
USPC ........................................................... 370/392
See application file for complete search history.

(56) References Cited

U.S. PATENT DOCUMENTS

| | | | |
|---|---|---|---|
| 8,166,205 B2 | 4/2012 | Farinacci et al. | |
| 2009/0037607 A1* | 2/2009 | Farinacci et al. | 709/249 |
| 2012/0106560 A1* | 5/2012 | Gumaste | 370/401 |

* cited by examiner

*Primary Examiner* — Shripal Khajuria
(74) *Attorney, Agent, or Firm* — Cindy Kaplan

(57) ABSTRACT

In one embodiment, a method includes receiving a packet at an edge device in a first network site in communication with a second network site through a transport network, the packet comprising a destination address for a host at the second network site, verifying at the edge device a connection with the host, and inserting the destination address in a forwarding information base at the edge device upon verifying the connection with the host. An apparatus and logic are also disclosed herein.

20 Claims, 4 Drawing Sheets

METHOD AND APPARATUS FOR FORWARDING INFORMATION BASE SCALING

TECHNICAL FIELD

The present disclosure relates generally to communication networks, and more particularly, to forwarding information base (FIB) scaling.

BACKGROUND

In network sites such as data centers, edges devices are used to route communications between hosts. The extension of layer 2 domains across network sites increases the number of MAC (Media Access Control) addresses stored at the edge device. Edge devices often have small hardware forwarding tables (FIBs) and not all MAC addresses may fit in the table.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
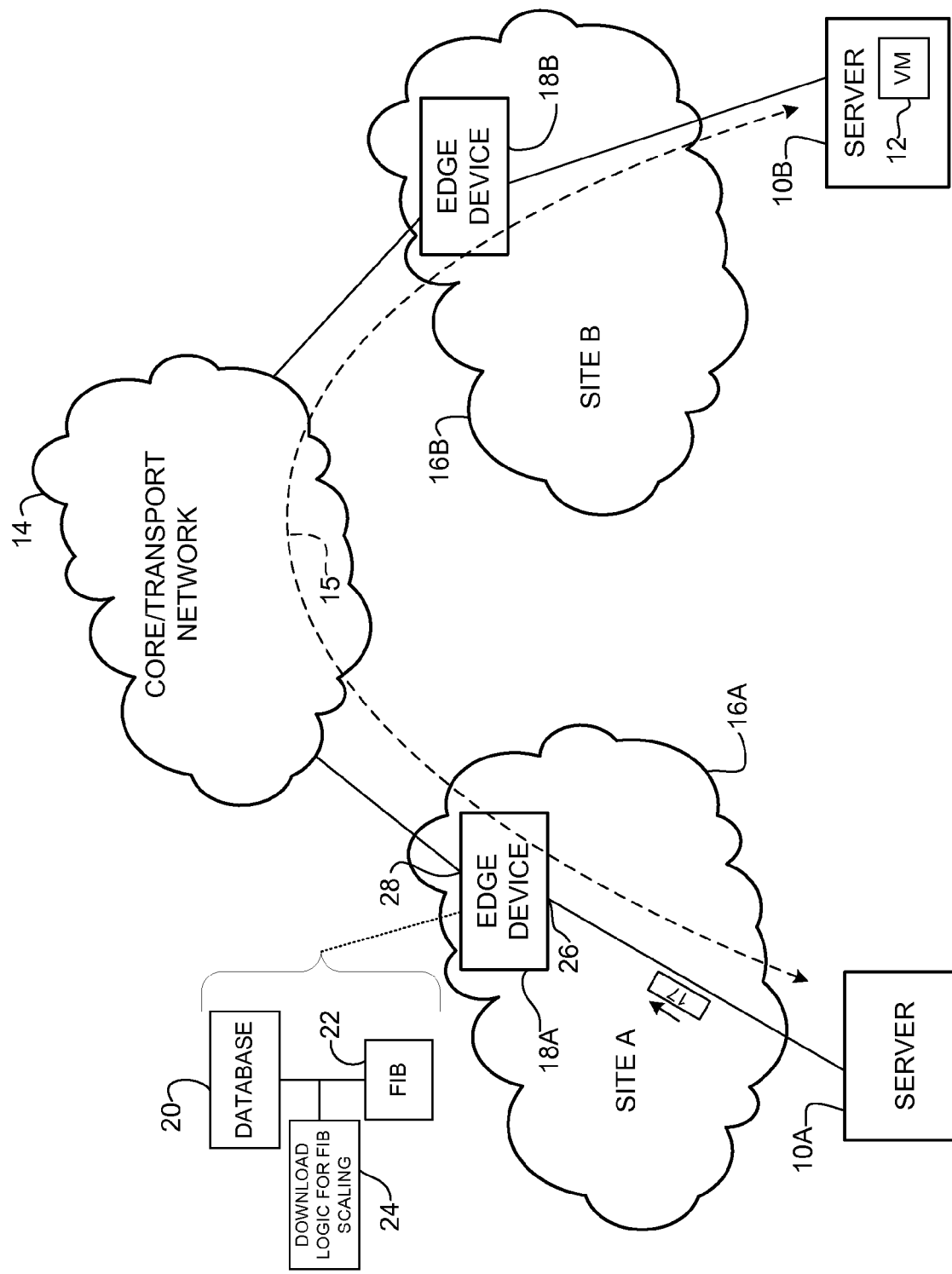
FIG. 1 illustrates an example of a network in which embodiments described herein may be implemented.

In one embodiment, a method generally comprises receiving a packet at an edge device in a first network site in communication with a second network site through a transport network, the packet comprising a destination address for a host at the second network site. The method further includes verifying at the edge device a connection with the host, and inserting the destination address in a forwarding information base at the edge device upon verifying the connection with the host.

In another embodiment, an apparatus generally comprises an internal interface for communication with network devices in a first network site, an overlay interface for communication with a second network site over a transport network, a forwarding information base, and a processor for processing a packet received on the internal interface and comprising a destination address for a host at the second network site, verifying a connection with the host, and inserting the destination address in the forwarding information base upon verifying the connection with the host.

In yet another embodiment, logic is encoded on one or more tangible computer readable media for execution and when executed is operable to perform a lookup in a database for a destination address in a packet received at an edge device in a first network site in communication with a second network site, the destination address comprising a media access control address for a host in the second network site, and insert the destination address in a forwarding information base at the edge device only if the destination address is found in the database.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Overlay Transport Virtualization (OTV) is an example of a method for extending layer 2 (L2) domains across network sites. OTV may be used, for example, to support L2 and layer 3 (L3) virtual private networks (VPNs) over a L2 or L3 infrastructure. OTV operates at edge devices located at the network sites to create an overlay network. The network sites may include servers that host hundreds of virtual machines (VMs), with each virtual machine communicating with any number of remote hosts. Remote site MAC (Media Access Control) addresses in OTV extended VLANs are installed at the local site edge device. Extension of the L2 domains across network sites results in a large number of MAC addresses at the edge device. Edge devices often have small hardware forwarding tables, thus not all MAC addresses may fit in the forwarding table.

The embodiments described herein make use of the fact that not all addresses need to be known at all sites, as not all sites are in communication with one another. The embodiments reduce hardware forwarding table size requirements by selectively downloading routes for which there are active flows. The embodiments thereby help to scale networks and provide reduced cost by allowing for smaller sized forwarding tables at the edge devices.

Referring now to the drawings, and first to FIG. 1, an example of a network in which embodiments described herein may be implemented is shown. For simplification, only a small number of nodes are shown. In the example shown in FIG. 1, two servers (hosts, endpoints, physical machines) 10A, 10B are in communication over network sites 16A and 16B, and transport (core) network 14. The network sites 16A, 16B may belong to a virtual private network (VPN), which may include any number of network sites. The networks 16A, 16B may be configured for use as a data center or any other type of network. The transport network 14 may be, for example, an L3 IP (Internet Protocol) network core, L2 metro Ethernet core, MPLS core, or any other type of network operable to forward IP packets.

The servers 10A, 10B may be, for example, a blade server, rack server, or any other type of network device and may be configured to host one or more virtual machines (VMs) 12. The term 'host' as used herein may refer to a physical machine (e.g., server) or virtual machine operating on the physical machine. The virtual machines 12 share hardware resources without interfering with each other, thus enabling multiple operating systems and applications to execute at the same time on a single computer. The virtual machines 12 may be moved between servers, across layer 2 or layer 3 boundaries, based on traffic patterns, hardware resources, or other criteria.

Each network site 16A, 16B includes an edge device 18A, 18B, respectively. In one embodiment, the edge devices 18A, 18B are configured to run OTV, which defines an overlay network coupled to each edge device. The network sites 16A, 16B are connected together via the edge devices 18A, 18B that operate in the overlay network and provide L2 and L3 connectivity among the sites (illustrated by data center interconnect (DCI) 15). OTV may be used to map MAC address destinations to IP next hops that are reachable through the transport network 14. Traffic destined for a particular MAC address is encapsulated in IP and carried through the IP network to its MAC address routing next hop. OTV is independent of the technology deployed in the core network 14.

The edge devices 18A, 18B in the OTV network are configured to perform L2 learning and forwarding on site-facing interfaces (internal interface 26) and IP-based virtualization on transport-facing interface (overlay interface 28). The dual functionality of the edge device provides the ability to connect L2 networks, L3 networks, or hybrid (L2 and L3) networks together. With OTV, state is maintained at the network edges, but is not required at other devices in the network sites 16A, 16B or core network 14.

In one example, OTV operates as described in U.S. Pat. No. 8,166,205, issued Apr., 24, 2012, which is incorporated herein by reference in its entirety. It is to be understood that OTV is one example of a method for extending layer 2 domains, and that other techniques for extending layer 2 networks over layer 3 (or layer 2) networks may be used, without departing from the scope of the embodiments.

Each network 14, 16A, 16B may include any number of edge devices or intermediate (core) nodes (e.g., routers, switches, access layer devices, aggregation layer devices, or other network devices), which facilitate passage of data within the network. Also, each edge device 18A, 18B may be in communication with any number of hosts at each network site 16A, 16B and may operate in more than one overlay network.

The edge devices 18A, 18B may be switches or other network devices configured to perform forwarding functions (e.g., L2 or L2/L3 devices). The edge device may be, for example, a NEXUS 7000 series switch available from Cisco Systems, Inc. of San Jose, Calif. It is to be understood that this is only an example of a network device that may be used to implement the embodiments described herein.

Each edge device 18A, 18B maintains a database 20 that is used to populate a forwarding information base (FIB) 22 (also referred to as a forwarding table, MAC address table, MAC table, or hardware address table). In one embodiment, the database 20 comprises a routing information base (RIB) (also referred to as a routing table or protocol database) that is constructed and updated by routing protocols. The database 20 may also be an overlay network database (e.g., OTV database), a link state database (LSDB), or other database that may also be used to populate the RIB. The FIB 22 is typically smaller than the database 20 and optimized for fast lookup of destination addresses. For example, the database 20 may be implemented in software, while the FIB 22 is implemented with fast hardware lookup mechanisms.

The FIB 22 contains addresses (unicast or multicast) and forwarding information (routes) for the addresses. The FIB 22 may include, for example, destination/link pairs for forwarding between internal links 26 (e.g., within network site A), from internal links to overlay link 28, and from the overlay link to the internal links. The addresses may be MAC addresses for hosts at the local site or a remote site.

As described in detail below, only routes for which a connection has been verified are downloaded from the database 20 to the FIB 22. The term 'connection' as used herein refers to an established or active connection or route between hosts at different network sites for which there is an active flow or conversation (i.e., packets transmitted between hosts). The edge devices connecting hosts with an established connection each include the address for the remote host in their database 20, however, the address may not yet have been inserted into the FIB 22. In order to save space in the FIB 22, addresses are installed in the FIB only for routes for which there are active flows (conversations). Details for verifying (identifying) the connection are described below.

The edge device further includes download logic 24 for selective downloading of routes for which there are active flows. Since not all network sites talk to each other, not all addresses are required to be known at all sites. As discussed above, programming of MAC addresses in the FIB 22 is limited to only those addresses for which there are established connections. Thus, the database 20 holds the state for all addresses, but only a subset of addresses are programmed in the hardware FIB 22, based on established connections. The data plane FIB size requirement is therefore reduced by selectively downloading routes for which there are active flows. This significantly reduces the number of entries required in the FIB 22.

For simplification, the database 20, FIB 22, and download logic 24 are only shown at edge device 18A. The other edge device 18B shown in FIG. 1 may have components similar to those shown for edge device 18A.

It is to be understood that the network shown in FIG. 1 and described herein is only an example and that the embodiments may be implemented in networks having different network topologies and network devices, without departing from the scope of the embodiments. For example, each network site may include any number or type of edge devices or hosts, and the overlay network may include any number of network sites. Also, the embodiments may be implemented in DCE (data center Ethernet) based sites, STP (spanning tree protocol) based sites, or sites based on FabricPath (FP) technology (available from Cisco Systems, Inc.) or TRILL (Transparent Interconnection of Lots of Links), as discussed below.

Figure 2:
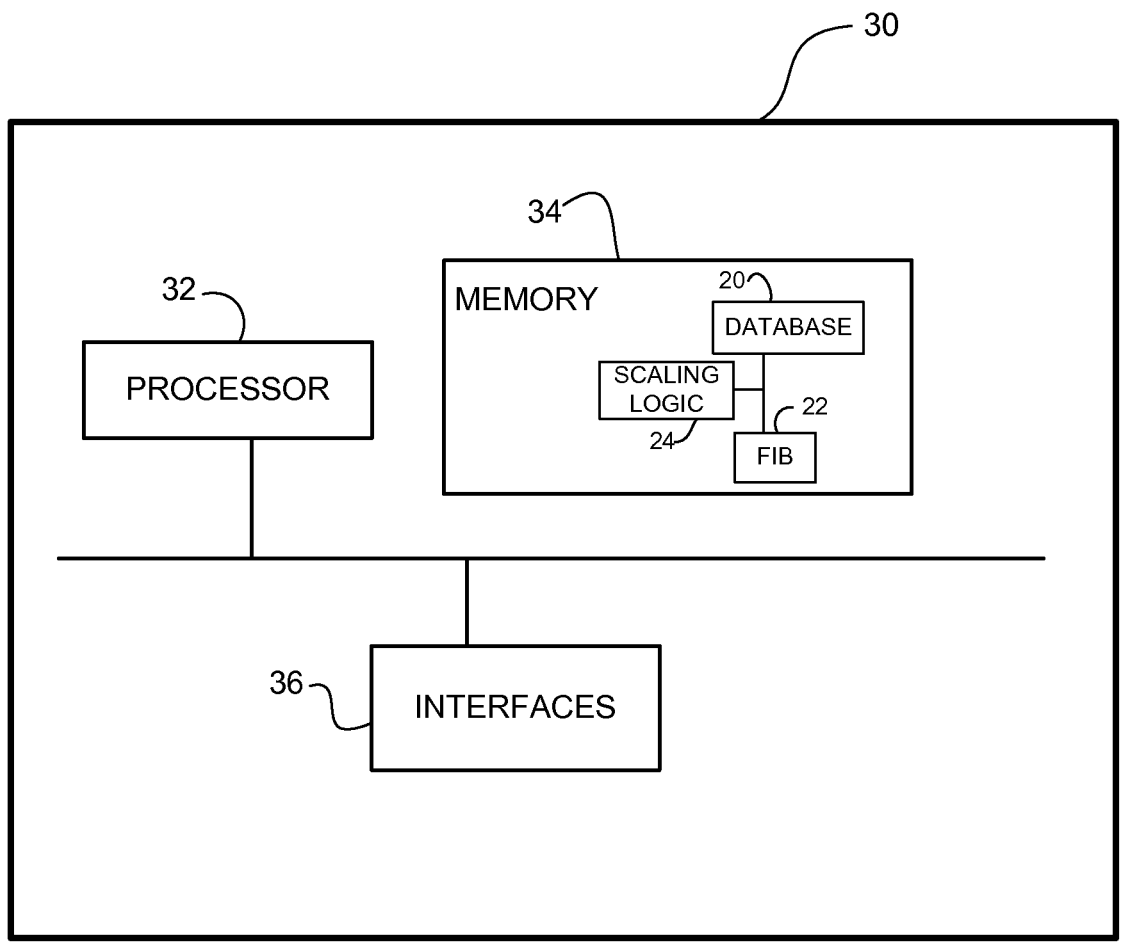
FIG. 2 depicts an example of a network device useful in implementing embodiments described herein.

An example of a network device (e.g., edge device) 30 that may be used to implement embodiments described herein is shown in FIG. 2. In one embodiment, network device 30 is a programmable machine that may be implemented in hardware, software, or any combination thereof. The device 30 includes one or more processor 32, memory 34, and network interfaces 36.

Memory 34 may be a volatile memory or non-volatile storage, which stores various applications, modules, and data for execution and use by the processor 32. As shown in FIG. 2, memory includes database 20, FIB 22, and scaling logic 24. In one embodiment, the database 20 is generated in software and used to program the FIB 22 in hardware. Addresses in the database 20 may be selectively inserted (programmed) in the FIB 22, as described below. The database 20 and FIB 22 may be constructed as lookup tables or any other database. Thus, the term 'lookup' as used herein may refer to any type of search in a database. The FIB 22 may be implemented in content-addressable memory (e.g., ternary content-addressable memory (TCAM)) or other data structure. Memory 34 may comprise any number and type of storage components.

Logic may be encoded in one or more tangible computer readable media for execution by the processor 32. For example, the processor 32 may execute codes stored in a computer readable medium such as memory 34. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 36 may comprise any number of interfaces (linecards, ports) for receiving data or transmitting data to other devices. The interface 36 may include, for example, an Ethernet interface for connection to a computer or network.

It is to be understood that the network device 30 shown in FIG. 2 and described above is only an example and that network devices having different components and configurations may be used without departing from the scope of the embodiments. For example, the network device 30 may further include any suitable combination of hardware, software, algorithms, processors, devices, components, or elements operable to facilitate the capabilities described herein.

Figure 3:
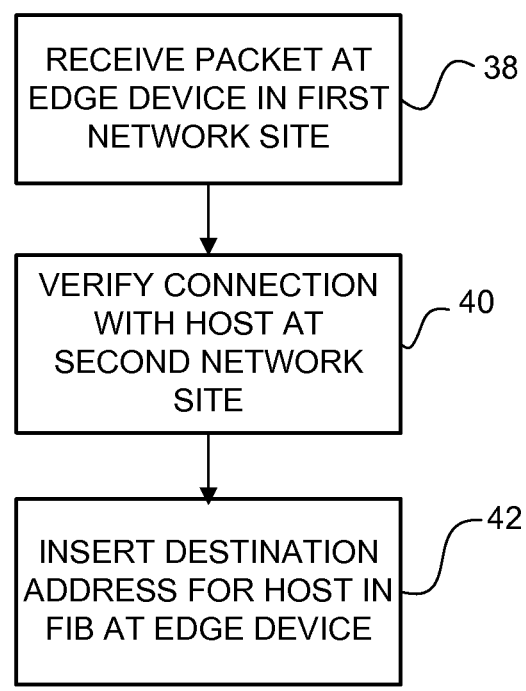
FIG. 3 is a flowchart illustrating an overview of a process for forwarding information base scaling, in accordance with one embodiment.

FIG. 3 is a flowchart illustrating an overview of a process for forwarding information base scaling, in accordance with one embodiment. At step 38, a first edge device in a first network site (e.g., edge device 18A in FIG. 1) receives a packet 17. In the example shown in FIG. 1, the packet 17 includes a source address for server 10A and a destination address for server 10B (or virtual machine 12) at network site 16B (second network site). The first edge device 18A is in communication with second edge device 18B in the second network site 16B via overlay network 15 extending the network sites over transport network 14.

The first edge device 18A verifies a connection with the host 10B at the second network site 16B (step 40). In one embodiment, verifying a connection with the host comprises finding the host address in the database 20, as described below with respect to FIG. 4. Upon verifying the connection, the first edge device 18A inserts (programs) the destination address for the host in the forwarding information base 22 at the first edge device (step 42).

In the embodiment described below, routes that have been learned from OTV, but not yet programmed in the hardware forwarding table 22 are referred to as RIB-reachable routes (i.e., destination addresses/links that are included in database 20 but not installed in FIB 22). The MAC addresses are first learned in OTV as RIB-reachable and the OTV control plane database 20 (e.g., LSDB or RIB) is fully populated. Only routes for which an established connection has been verified are programmed in the hardware FIB 22. As described below, connections are verified based on destination address (e.g., destination MAC address for OTV).

Figure 4:
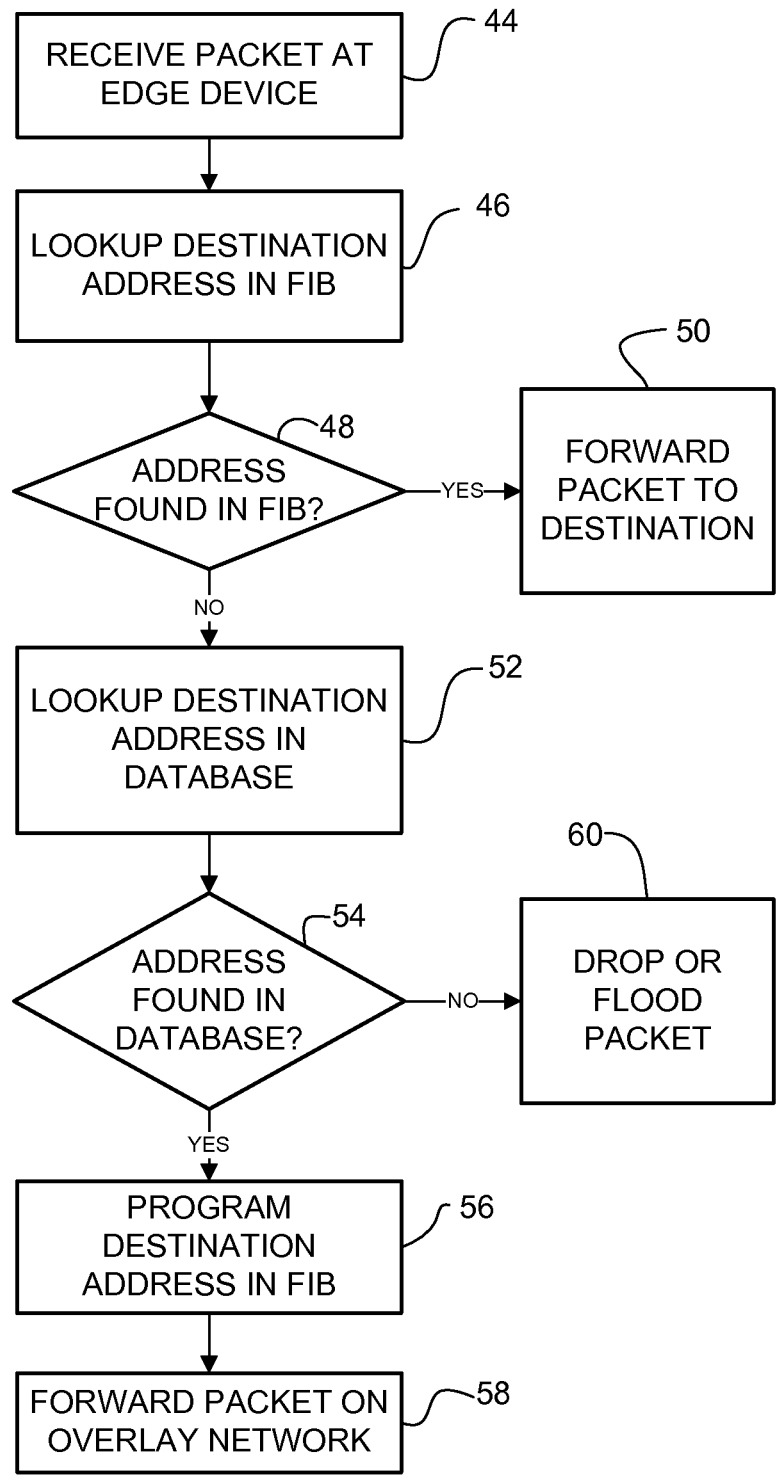
FIG. 4 is a flowchart illustrating details of the process shown in FIG. 3, in accordance with one embodiment.

FIG. 4 is a flowchart illustrating details of the process shown in FIG. 3, in accordance with one embodiment. At step 44, the edge device 18A receives packet 17 (FIGS. 1 and 4). A lookup is performed in the FIB 22 for the destination address in the received packet (step 46). If the address is found in the FIB, the packet is forwarded according to the route specified for the destination address in the FIB (steps 48 and 50). The destination address may be, for example, a local destination or a previously learned address for an established connection. If the destination MAC address is not in the FIB 22, a lookup is performed for the address in the database 20 (step 52). If the destination MAC address is found in the database 20 (RIB-reachable), the destination MAC address is programmed in the FIB 22 and the packet (or subsequent packet in same flow) is forwarded on the overlay network (steps 54, 56, and 58). If the destination address is not found in the database 20, the packet is dropped or flooded everywhere (step 60).

It is to be understood that the processes illustrated in FIGS. 3 and 4 are only examples and that steps may be modified or added without departing from the scope of the embodiments.

The embodiments described herein may be implemented, for example, in STP (Spanning Tree Protocol) based sites or sites based on FabricPath (FP) technology (available from Cisco Systems, Inc.) or TRILL (Transparent Interconnection of Lots of Links). The following provides an example for FabricPath (FP) sites.

Referring again to FIG. 1, edge devices 18A and 18B are both FP edges and OTV edges in this example. In this case, FP learning will make programming decisions based on RIB-reachable MAC information on the overlay. In the initial state, no MAC addresses have been learned. For the first packet 17 transmitted at host 10A and destined for host 10B, the packet is flooded in site 16A. Edge device 18A receives the packet (flood) sourced from host 10A. Per FabricPath rules, host 10A is not programmed at the FP edge device 18A. Per OTV rules, host 10A is advertised to the overlay network (on data center interconnect 15). Edge device 18B learns host 10A as RIB-reachable (present in RIB, not programmed in FIB). The flood is not forwarded to the overlay as the destination (host 10B) is not known at this time by OTV (neither RIB-reachable nor programmed in the FIB).

A second packet (not shown) is transmitted from host 10B to host 10A. The packet is flooded in FP site 16B. Edge device 18B receives the packet (flood) sourced from host 10B. Per FP rules, host 10B is programmed at edge device 18B based on host 10A being RIB-reachable in edge device 18B. Per OTV rules, host 10B is advertised to the overlay network. Edge device 18A learns host 10B as RIB-reachable (present in RIB, but not programmed in FIB). Edge device 18B looks up destination (host 10A) in FIB and there is a miss. The edge device 18B then looks up the destination (host 10A) in the RIB and there is a hit (RIB-reachable). A connection has been verified with the host 10A, therefore, edge device 18B programs host 10A into its FIB and forwards the packet to host 10A over the overlay network 15 based on the new FIB entry for host 10A that has just been programmed.

A third packet is transmitted from host 10A to host 10B. Since the host 10B is known, the packet is unicast in FP site 16A. Edge device 18A receives the packet sourced from host 10A. Per FP rules, host 10A is programmed at the FP edge device 18A based on host 10B being RIB-reachable in edge device 18A. Edge device 18A looks up destination host 10B in the FIB and there is a miss. Edge device 18A then looks up destination host 10B in the RIB and there is a hit (RIB-reachable). An established connection has been verified for host 10B. Edge device 18A programs host 10B into its FIB and forwards the packet to host 10B over the overlay network based on the new FIB entry for host 10B that has just been programmed at the edge device 18A.

At this point, there is full OTV and FP state for the flow between hosts 10A and 10B on sites 16A and 16B. Other sites will only have RIB-reachable entries, but these will not be programmed in the FIB unless there are active flows for the hosts on those sites. Thus, the embodiments provide a full RIB, but a partial FIB and thereby reduce utilization of data plane memory.

It is to be understood that the process flow described above is only an example and the process may be modified, without departing from the scope of the embodiments. For example, in one embodiment, the edge device 18A learns host 10A upon receiving the first packet in the process flow described above. In another embodiment, the edge device 18A may cache the source address and destination address upon receiving the first packet, but not install host 10A until receiving the third packet.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving a packet at an edge device in a first network site in communication with a second network site through a transport network, the packet comprising a destination address for a host at the second network site, the edge device comprising a switch and the host comprising an endpoint in communication with a second edge device at the second network site;
verifying at the edge device in the first network site, a connection with the host at the second network site, wherein verifying said connection comprises finding the destination address of the host in a database located at the edge device in the first network site; and
inserting the destination address in a forwarding information base at the edge device upon verifying said connection with the host for use in forwarding packets belonging to a same flow as the packet received at the edge device;
wherein the forwarding information base selectively downloads routes for active flows through verification of connection with hosts in remote network sites.

2. The method of claim 1 wherein the database comprises a routing information base.

3. The method of claim 1 wherein the database comprises an overlay network database.

4. The method of claim 1 further comprising dropping or flooding the packet if the destination address is not in the database.

5. The method of claim 1 wherein the destination address is inserted into the database upon receiving an advertisement of the host.

6. The method of claim 1 further comprising receiving a second packet belonging to the same flow as the packet received at the edge device and forwarding the second packet based on a lookup for the destination address in the forwarding information base.

7. The method of claim 1 wherein inserting the destination address in the forwarding information base comprises programming the destination address in a hardware forwarding table.

8. The method of claim 1 wherein the destination address comprises a media access control address associated with a physical machine or a virtual machine.

9. The method of claim 1 wherein the edge device is in communication with the second edge device in the second network site via an overlay network extending the network sites over the transport network.

10. The method of claim 9 wherein the network sites comprise data center networks and the overlay network comprises a data center interconnect.

11. The method of claim 9 wherein the edge devices comprise switches and the overlay network extends layer 2 domains at the network sites over the transport network.

12. The method of claim 1 further comprising performing a lookup in the forwarding information base and determining that the destination address is not in the forwarding information base before verifying said connection.

13. An apparatus comprising:
an internal interface for communication with network devices in a first network site;
an overlay interface for communication with a second network site over a transport network;
a forwarding information base; and
a processor for processing a packet received on the internal interface and comprising a destination address for a host at the second network site, verifying a connection with the host, and inserting the destination address in the forwarding information base upon verifying said connection with the host for use in forwarding packets belonging to a same flow as the packet received at the edge device;
wherein the edge device comprises a switch and the host comprises an endpoint configured for communication with a second edge device at the second network site and wherein verifying said connection with the host comprises finding the destination address of the host in a database located at the edge device in the first network site, and
wherein the forwarding information base is configured to selectively download routes for active flows through verification of connection with hosts in remote network sites.

14. The apparatus of claim 13 further comprising the database.

15. The apparatus of claim 14 wherein the database comprises a routing information base.

16. The apparatus of claim 13 wherein the destination address comprises a media access control address associated with a physical machine or a virtual machine.

17. The apparatus of claim 13 wherein the apparatus comprises a switch and the overlay interface is configured for operation in an overlay network operable to extend layer 2 domains at the network sites over the transport network.

18. The apparatus of claim 13 wherein inserting the destination address in the forwarding information base comprises programming the destination address in a hardware forwarding table.

19. Logic encoded on one or more non-transitory computer readable media for execution and when executed operable to:
perform a lookup in a database for a destination address in a packet received at an edge device in a first network site in communication with a second network site, the destination address comprising a media access control address for a host in the second network site, the host comprising an endpoint in communication with a second edge device at the second network site; and
insert the destination address in a forwarding information base at the edge device only if the destination address is found in the database;
wherein the forwarding information base selectively downloads routes for active flows through verification of connection with hosts in remote network sites.

20. The method of claim 1 wherein the host comprises a virtual machine located at a server.

* * * * *